(No Model.)

T. JONES & S. A. HOKE.
RAILROAD SWITCH LAMP.

No. 592,294. Patented Oct. 26, 1897.

Witnesses:
Chas Keefe
John Plume

Inventors:
Thomas Jones
Samuel A. Hoke

UNITED STATES PATENT OFFICE.

THOMAS JONES AND SAMUEL A. HOKE, OF TACOMA, WASHINGTON.

RAILROAD-SWITCH LAMP.

SPECIFICATION forming part of Letters Patent No. 592,294, dated October 26, 1897.

Application filed April 23, 1897. Serial No. 633,523. (No model.)

*To all whom it may concern:*

Be it known that we, THOMAS JONES and SAMUEL A. HOKE, citizens of the United States, and residents of the city of Tacoma, county of Pierce, and State of Washington, have invented a new and useful Three-Way Railway-Switch Lamp, attachable to any ordinary switch-stand used for common switch-lamps, of which the following is a specification.

Our invention relates to improvements in railway-switch lamps; and the objects of the improvements are to afford greater certainty and safety in the use of railway-signal switch-lamps, and especially by the use of six lenses in each lamp instead of four, indicating to engineers and others engaged in moving trains the condition of each track in case of a three-way switch. We attain said objects by the mechanism illustrated in the accompanying drawings, in which—

Figure 1:
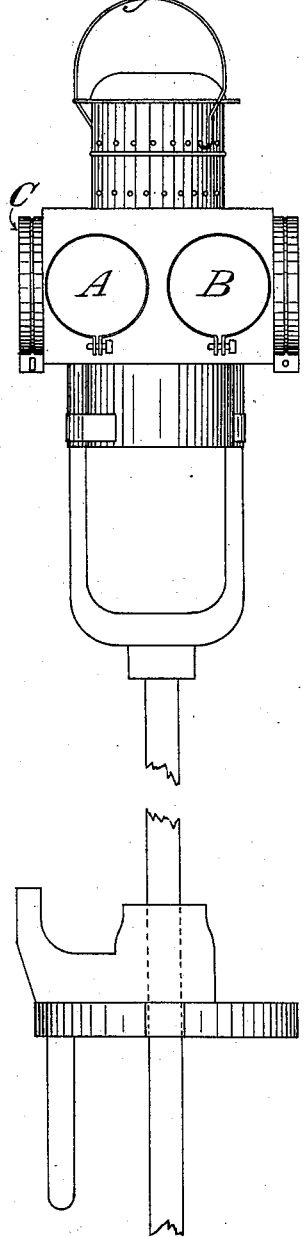
Figure 2:
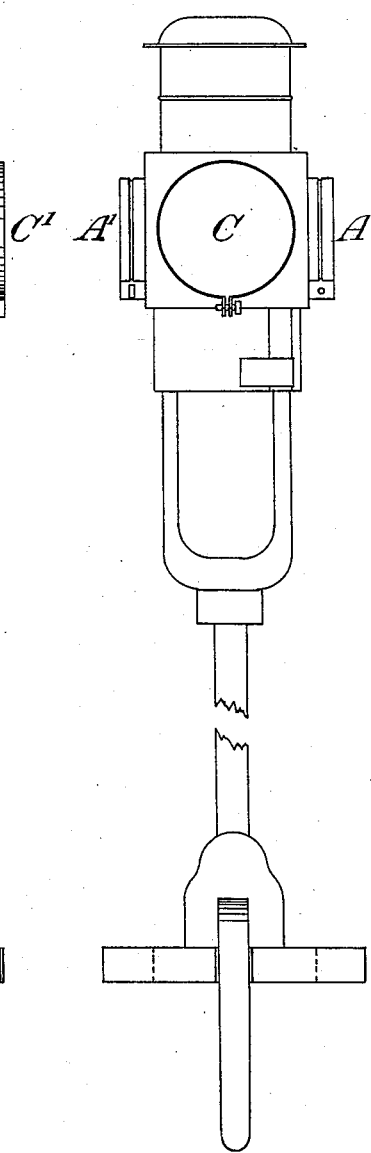
Figure 3:
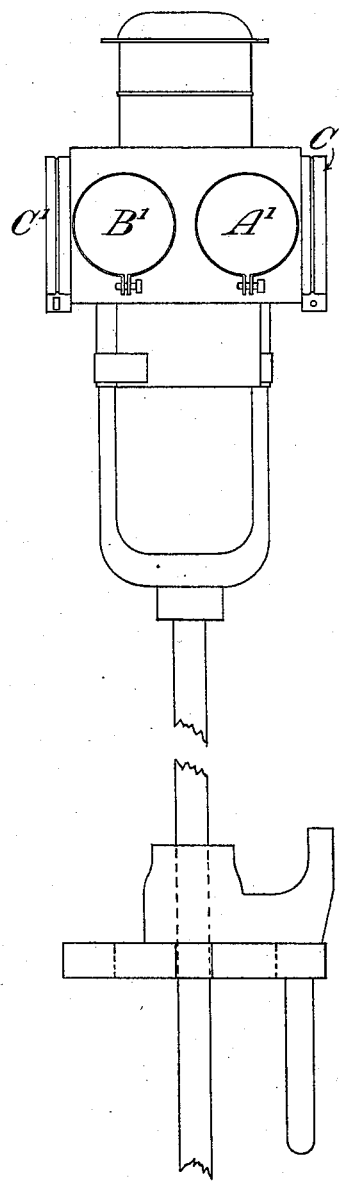

Figure 1 is a vertical section of the front side view of the lamp. Fig. 2 is a vertical section of the end of the lamp as it appears when observed from either end. Fig. 3 represents the rear side view of the lamp.

The portions of the figures below the break in the lamp-stand show the ordinary switch-stands upon which the lamp may be used and when the lamp-stand is inserted and adjusted to the switch-stand.

In this lamp the lenses are set in the following manner: First, the end lenses are of green color, set in direct line opposite each other; second, two red lenses are set directly opposite each other at the point indicated by the letter B in Fig. 1 and the letter B' in Fig. 3, Fig. 1 giving a front view and Fig. 3 giving a rear view of lamp; third, two white-colored lenses are set directly opposite each other at the points in the lamp indicated by the letter A in Fig. 1 and by the letter A' in Fig. 3.

The lamp, as to the receptacles in which the lenses are placed, is so constructed that the location of the different lenses in the lamp can be changed at any time at the option of the user of the lamp, so that, if desired, either of the three differently-colored lenses can be placed at the ends or in the side and toward either end of the lamp.

This lamp is especially designed for the use of three-throw switches and to be ordinarily used for such switches, the green lens to indicate that the switch is set for the center track, the white lens to indicate that the center or main track is connected with the switch or side-track corresponding to the side upon which the white lens appears, the red light to indicate that the side-track or switch corresponding with the side upon which the red light appears is not connected with the main or center track.

While the lenses of the same color are located opposite each other in the sides and ends of the lamp, the color of the lenses on opposite sides of the casing are reversely arranged—that is, supposing the sides of the lamp so stand with reference to the track that the red lens stands next thereto, by so turning the lamp (by operating the switch-handle) as to reverse the location of the sides of the lamp the reverse or white side light will be brought next the track. What is meant by "reversely arranged" may be further illustrated as follows: Commencing at one of the ends of the lamp with a green lens and tracing around the lamp to the right we find the lenses occurring in the following order: green, red, white, green, white, red; or tracing around the lamp in the reverse direction—that is, to the left—we find the lenses occurring in the same order—to wit, green, red, white, green, white, red. The meaning of the term "reversely arranged" may be further explained by stating that each transposition of the opposite sides of the casing of the lamp when in place on the switch-stand brings a differently-colored lens next to the track, alternating from white to red, or vice versa.

The light to be used may be produced by any ordinary lighting agency or material used for illuminating purposes, such as oil, electricity, or gas.

The size of the lamp and the lenses may be such as the user may desire, and the lamp can be used on any ordinary switch-stand.

To show how the lamp operates as a signal to the condition of the tracks or switches, we will suppose the switch set for the center or main track, as shown in Fig. 2. The ends of the lamp containing the green lenses stand parallel with the main track and show that the switch is connected with the main track. Now, as shown in Fig. 1, when handle of switch is thrown to the left white lens (letter A) shows that the throw-rail or switch is connected with the side-track on the side corresponding with that of the white lens and that the track on the side of the red lens (letter B) is not connected, and when the switch-handle is thrown to the right white light A, Fig. 1, shows that the switch or throw-rail is connected on the right side, being the side corresponding with the white light, and red light B shows the track on the same side as red light to be disconnected. To further explain, the white and red lenses are so arranged that when approached on the track from either direction the white shows that the switch and main track are connected on that side and the red that the switch and main track are disconnected on that side. If on approaching a three-way switch on a north and south track from the south the white light is to the left of the red one, that shows that main track and west switch are connected. Approaching the same switch from the north, the lamp, remaining in the same position as above, also shows the main track to be connected with the west switch, which, however, when approached from the north is the right-hand switch, the exact reverse of the foregoing being shown by the red light. In the given position it, when approached from the south, shows the switch on the side it is located—that is, the right hand or east switch—to be disconnected, and approached from the north side shows that the switch on its side—that is, the left or east side—is disconnected.

What we do claim as our invention is—

A railway-lamp having a plurality of lenses of different colors on two sides of the casing, the lenses of the same color being located opposite each other, and the colors of the lenses on opposite sides of the casing being reversely arranged.

THOMAS JONES.
SAMUEL A. HOKE.

In presence of—
CHAS. KEEFE,
JOHN PLUME.